July 4, 1950 H. M. BROWN ET AL 2,513,399
VARIABLE SPEED DRIVE FOR ROLL PRESSES
Filed April 5, 1949
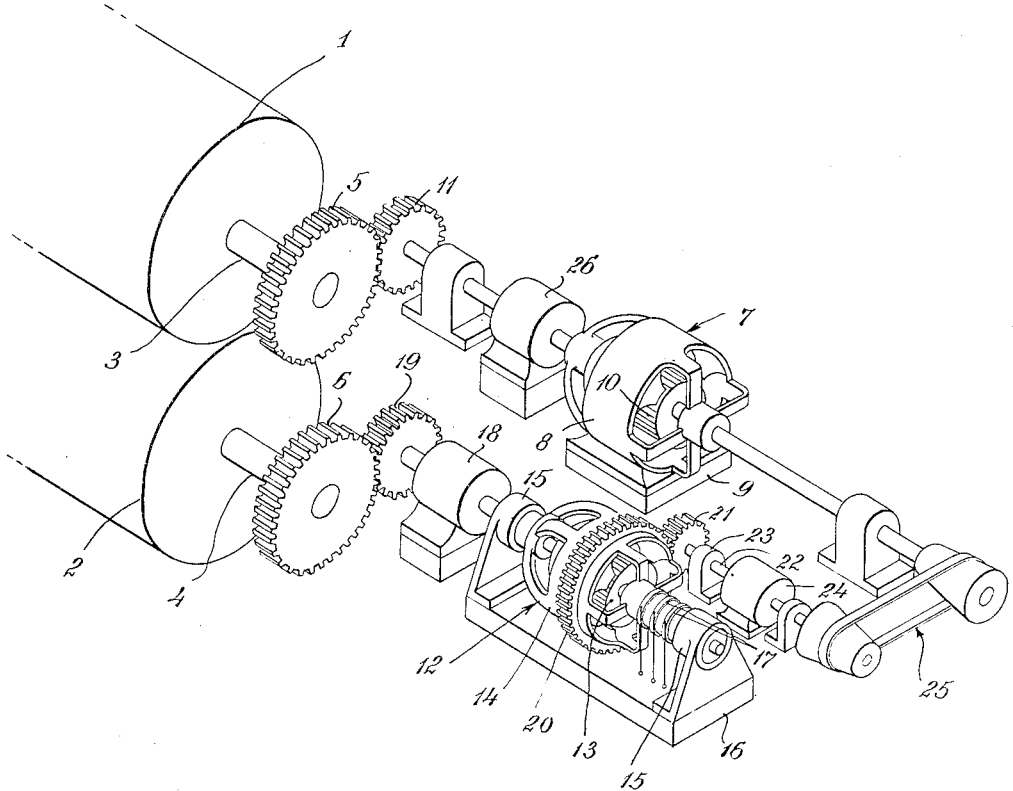
INVENTOR
HOWARD M. BROWN
AND GEORGE CAWLEY
BY
Pennie, Edmonds, Morton and Barrows
ATTORNEYS Patented July 4, 1950

2,513,399

UNITED STATES PATENT OFFICE 2,513,399

VARIABLE-SPEED DRIVE FOR ROLL PRESSES

Howard M. Brown, Wood-Ridge, and George Cawley, Upper Montclair, N. J.

Application April 5, 1949, Serial No. 85,594

8 Claims. (Cl. 318—5)

This invention relates to double roll presses for the pressing of plastic and semi-plastic materials and to means for driving the same. In such presses it is customary to drive both rolls of the press. For many applications it is desirable to provide a drive which permits operating the separate rolls of the press at separate angular speeds. It may be desired to operate the two rolls at the same or at variably different speeds. If the diameter of the two rolls is not the same, for example as a result of refinishing operations applied unequally thereto, it is necessary to drive the rolls at different angular speeds, if they are to have the same peripheral speed.

Various arrangements have been proposed for providing separately controllable drives to the separate rolls of a press, most of which involve elaborate equipment for interlocking both electrically and mechanically the separate driving means associated with each roll of the press.

We have devised a method and means for driving the separate rolls of a roll press at adjustably different angular speeds which eliminates the necessity for electrical connections between the driving motors associated with the separate rolls of the press and which is simple and inexpensive.

According to our invention, we provide a driving motor for each roll of the press, and we link the rotor of one motor to the stator of the second motor through a variable ratio drive, the stator of the second motor being mounted for rotation with respect to its base.

As the relative rotor-stator speeds of the two motors are constant or substantially constant, the addition of a variable speed to the stator of the second motor produces a variable differential between the speeds of the two rotors to which the rolls of the press are connected.

An embodiment of our invention is shown diagrammatically in the single figure of drawings.

The rolls 1 and 2 of a roll press are affixed to shafts 3 and 4 journaled at both ends of the rolls in suitable bearings not shown. The rolls may be made of any suitable material, plastic or rigid, and may be of the same or of different diameters. They may make contact with each other or may be spaced by a distance appropriate to the thickness desired to be imparted to the material passed through the press.

Affixed to an end of each of the shafts 3 and 4 are spur gears 5 and 6 to which power is transmitted to turn the rolls.

The driving motor 7 has a stator 8 fixedly connected to a base 9 and a rotor 10 connected to the spur gear 5 through a suitable pinion 11. Of course additional speed changing elements such as the reduction gear unit 26 may be introduced between the rotor 10 of the motor 7 and the gear 5. The motor 7 is preferably of a constant speed type, so that within the capacity of the motor the rotor 10 is driven at constant angular speed. Since the stator 8 is fixed to the base, the roll 1 will therefore also be driven at constant angular speed.

The roll 2 is driven separately from the roll 1 by a motor 12 having a rotor 13 and stator 14. The stator 14 is supported at either end in bearings 15 forming part of a base 16. The rotor 13 is supported in suitable bearings, which may be affixed to the stator 14 or to the base 16, so as to be capable of rotation with respect to the stator 14 and to the base 16. Power is supplied to the stator 14 by means of slip rings 17 affixed thereto. The rotor 13 connects through a speed reducing unit 18 to a pinion 19 which meshes with the gear 6 of the roll 2.

The stator 14 has affixed thereto a toothed ring 20 mounted coaxially with the stator. A pinion 21 is affixed to a shaft 22 journaled in bearings 23 fixed with respect to the base 16. The shaft 22 connects through a suitable speed reducer 24 with an adjustable ratio drive generally indicated at 25, the other end of which is connected to the rotor 10 of the motor 7. In the embodiment illustrated the variable ratio drive consists of a cone and belt drive but it is obvious that other forms of variable speed ratio drive may be used instead.

The motors 7 and 12 establish independently of each other their relative rotor-stator speed. The angular speed of the roll 1 is determined directly by the speed of the rotor 10 whereas the speed of the roll 2 is determined by the rotor-stator speed of the motor 12 augmented or diminished by the angular speed of its stator 14. An angular velocity is imparted to the stator 14 by the motor 7 operating through the variable ratio drive 25.

The sense of the connection between the stator 14 and a rotor 10 may be either that which turns the stator 14 in the sense of rotation of its own rotor 13 or the reverse. If the sense of rotation of the stator 14 is the same as that of its rotor the angular speed of the roll 2 will be increased by the connection to the motor 7, and vice versa. The speed reducing elements 18 and 24 may be proportioned in any desired manner. By the employment of suitable speed reducing devices as required two rolls 1 and 2 having a given ratio of diameters may be driven at angular speeds having a variable ratio to each other, according to the setting of the variable ratio drive 25. The peripheral speeds of the rollers may therefore be made either of the same or different, with the peripheral speed of the roll 1 either greater or less than that of the roll 2.

We claim:

1. A double roll press and drive therefor adapted to turn the separate rolls of the press at adjustably different angular speeds comprising two rolls, means to support the rolls in parallel relation, a driving motor connected to one roll, a second driving motor connected to the other roll, a mounting for the stator of the second driving motor permitting the said stator to rotate relative to its base, and variable speed driving means operatively connecting the rotor of the first driving motor with the stator of the second driving motor.

2. A double roll press and drive therefor adapted to turn the separate rolls of the press at adjustably different angular speeds comprising two rolls, means to support the rolls in parallel relation, a constant speed driving motor connected to one roll, a second constant speed driving motor connected to the other roll, a mounting for the stator of the second driving motor permitting the said stator to rotate relative to its base, and variable speed driving means operatively connecting the rotor of the first driving motor with the stator of the second driving motor.

3. A drive for the rolls of a two-roll press adapted to drive the separate rolls of the press at adjustable speeds, said drive comprising a first constant speed motor having a fixed stator and a rotor operatively connected to one of the rolls of the press, a second constant speed drive motor having a rotatably mounted stator and having a rotor operatively connected to the other roll of the press, and a variable ratio drive operatively connecting the rotor of the first drive motor with the stator of the second drive motor.

4. A drive for the rolls of a two-roll press adapted to drive the separate rolls of the press at adjustable speeds, said drive comprising a first motor having a fixed stator and a rotor operatively connected to one of the rolls of the press, a second drive motor having a rotatably mounted stator and a rotor operatively connected to the other roll of the press, and a variable ratio drive operatively connecting the rotor of the first drive motor with the stator of the second drive motor.

5. A variable speed drive for the two rolls of a double roll press adapted to drive the said rolls at variable relative speeds, the said drive comprising a first constant speed drive motor having its rotor operatively connected to one of the said rolls, a second constant speed drive motor having its rotor operatively connected to the other of the said rolls, a rotatable mounting for the stator of the second drive motor, a toothed ring affixed to the stator of the second drive motor concentrically therewith, and a variable ratio drive operatively connecting the rotor of the first drive motor with the said toothed ring.

6. A variable speed drive for the two rolls of a double roll press adapted to drive the said rolls at variable relative speeds, the said drive comprising a first drive motor having its rotor operatively connected to one of the said rolls, a second drive motor having its rotor operatively connected to the other of the said rolls, a rotatable mounting for the stator of the second drive motor, a toothed ring affixed to the stator of the second drive motor concentrically therewith, and a variable ratio drive operatively connecting the rotor of the first drive motor with the said toothed ring.

7. A variable speed drive for the two rolls of a double roll press adapted to drive the said rolls at variable relative speeds, the said drive comprising a first constant speed drive motor having its rotor operatively connected to one of the said rolls, a second constant speed drive motor having its rotor operatively connected to the other of the said rolls, a rotatable mounting for the stator of the second drive motor, and a variable ratio drive operatively connecting the rotor of the first drive motor with the stator of the second drive motor.

8. A variable speed drive for the two rolls of a double roll press adapted to drive the said rolls at variable relative speeds, the said drive comprising a first drive motor having its rotor operatively connected to one of the said rolls, a second drive motor having its rotor operatively connected to the other of the said rolls, a rotatable mounting for the stator of the second drive motor, and a variable ratio drive operatively connecting the rotor of the first drive motor with the stator of the second drive motor.

HOWARD M. BROWN.
GEORGE CAWLEY.

No references cited.